United States Patent
He et al.

(10) Patent No.: US 12,541,324 B2
(45) Date of Patent: Feb. 3, 2026

(54) TRAFFIC CONTROL METHOD AND APPARATUS

(71) Applicant: Huawei Technologies Co., Ltd., Shenzhen (CN)

(72) Inventors: Xianjun He, Chengdu (CN); Bowei Yu, Chengdu (CN); Zhaojiao Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/633,957

(22) Filed: Apr. 12, 2024

(65) Prior Publication Data

US 2024/0256176 A1    Aug. 1, 2024

Related U.S. Application Data

(63) Continuation of application No. PCT/CN2022/101671, filed on Jun. 27, 2022.

(30) Foreign Application Priority Data

Oct. 14, 2021  (CN) .......................... 202111195329.4
Jan. 29, 2022  (CN) .......................... 202210111753.4

(51) Int. Cl.
G06F 3/06          (2006.01)

(52) U.S. Cl.
CPC .......... *G06F 3/0656* (2013.01); *G06F 3/0611* (2013.01); *G06F 3/0635* (2013.01); *G06F 3/067* (2013.01)

(58) Field of Classification Search
CPC .... G06F 3/0656; G06F 3/0611; G06F 3/0635; G06F 3/067
USPC .......................................................... 711/154
See application file for complete search history.

(56) References Cited

U.S. PATENT DOCUMENTS

| | | | |
|---|---|---|---|
| 5,761,417 A | 6/1998 | Henley et al. | |
| 2014/0304456 A1* | 10/2014 | Narasimha | G06F 13/1694 711/103 |
| 2019/0235787 A1* | 8/2019 | Kanno | G06F 3/0688 |
| 2020/0192600 A1* | 6/2020 | Kanno | G06F 3/0604 |
| 2022/0188021 A1* | 6/2022 | Park | G06F 3/0688 |

FOREIGN PATENT DOCUMENTS

| | | |
|---|---|---|
| CN | 102508619 A | 6/2012 |
| CN | 111858418 A | 10/2020 |

\* cited by examiner

*Primary Examiner* — Than Nguyen
(74) *Attorney, Agent, or Firm* — Conley Rose, P.C.

(57) ABSTRACT

A traffic control method includes: receiving a first input/output (I/O) request sent by a first client device in a plurality of client devices, where the first I/O request is for accessing a first hard disk in a plurality of hard disks configured for the server device; and processing, by the server device, the first I/O request by using a first buffer region in a plurality of buffer regions.

20 Claims, 6 Drawing Sheets

---

S201. An RNIC of a storage server receives a second I/O request sent by a second client device, where the second I/O request is for accessing a first hard disk of the storage server S202. If the RNIC of the storage server determines that a second buffer required for processing the second I/O request is greater than a size of an idle buffer region in a first buffer region, the RNIC of the storage server determines to process data of the second I/O request a plurality of times S101. An RNIC of a storage server receives a first I/O request sent by a first client device, where the first I/O request is for accessing a first hard disk of the storage server S301. The RNIC of the storage server determines a size of occupied space in a first buffer region corresponding to the first hard disk S302. When determining that the size of the occupied space in the first buffer region meets a first preset condition, the RNIC of the storage server sends a congestion indication to the first client device S303. After the storage server processes the first I/O request, the RNIC of the storage server sends an I/O response packet to the first client device

FIG. 8

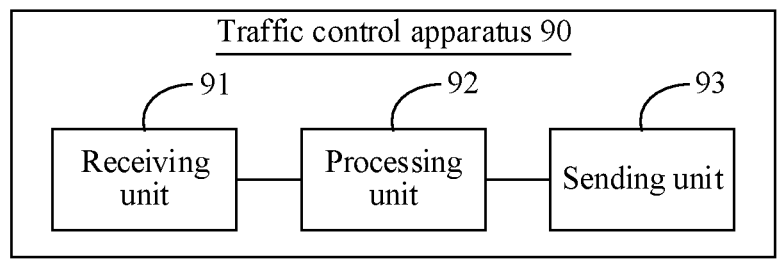

FIG. 9

TRAFFIC CONTROL METHOD AND APPARATUS

CROSS-REFERENCE TO RELATED APPLICATIONS

This is a continuation of International Patent Application No. PCT/CN2022/101671 filed on Jun. 27, 2022, which claims priority to Chinese Patent Application No. 202111195329.4 filed on Oct. 14, 2021 and Chinese Patent Application No. 202210111753.4 filed on Jan. 29, 2022. All of the aforementioned patent applications are hereby incorporated by reference in their entireties.

TECHNICAL FIELD

This application relates to the field of storage technologies, and in particular, to a traffic control method and apparatus.

BACKGROUND

In a storage system, a client device usually reads and writes data in a storage server by performing a remote direct memory access (RDMA) operation. RDMA is a transport layer network protocol for resolving a data processing delay in network transmission, and RDMA-based memory access is characterized by a low delay and a low central processing unit (CPU) occupation rate.

In a process in which the client device reads and writes the data in the storage server by performing the RDMA operation, some functions of storage software of the storage server are usually offloaded to a network interface card (NIC). In this way, after the NIC of the storage server receives an input/output (I/O) request sent by the client device by performing the RDMA operation and processes the I/O request, the NIC of the storage server may directly interact with a hard disk, thereby reducing interaction between the storage software and the NIC of the storage server and interaction between the storage software and the hard disk, and further reducing a delay of remotely reading and writing the data in the storage server by the client device.

For the storage server, one queue pair (QP) in the NIC of the storage server may be connected to a plurality of hard disks, to implement reading and writing of the plurality of hard disks. However, when a hard disk in the plurality of hard disks is slow in reading and writing, reading and writing of other hard disks are slowed down, causing deterioration of overall performance of the storage system.

SUMMARY

This application provides a traffic control method and apparatus, to ensure read and write performance of a storage system.

To achieve the foregoing objective, this application provides the following technical solutions.

According to a first aspect, this application provides a traffic control method, and the method is used for a server device. In the method, the server device receives a first I/O request sent by a first client device in a plurality of client devices, where the first I/O request is for accessing a first hard disk of the server device, and the first hard disk is one of a plurality of hard disks configured for the server device. After receiving the first I/O request, the server device processes the first I/O request by using a first buffer region in a plurality of buffer regions, where the plurality of buffer regions is respectively for buffering data of I/O requests for accessing the plurality of hard disks, and the first buffer region is dedicated to buffering data of I/O requests for accessing the first hard disk.

According to the traffic control method provided in this application, because each hard disk of the server device is configured with an independent and dedicated buffer region, after receiving the first I/O request for accessing the first hard disk, the server device needs to process the first I/O request only based on the first buffer region that uniquely corresponds to the first hard disk. In this way, even if the first hard disk of the server device is slow in reading/writing due to a fault or another reason, a read and write speed of another hard disk of the server device is not affected, thereby ensuring overall performance of a storage system in which the server device is located.

In addition, because each hard disk of the server device is configured with an independent and dedicated buffer region, even if a client device sends a large quantity of I/O requests for accessing the first hard disk to the server device in a short time, the server device only fully occupies a buffer region corresponding to the first hard disk to process these I/O requests, without affecting a speed at which another client device accesses another hard disk of the server device. That is, according to the traffic control method provided in this application, a problem that available resources are not uniformly distributed when a plurality of client devices accesses a server device can be avoided.

In a possible design, the method further includes determining that a size of occupied space in the first buffer region meets a first preset condition, and sending, in response to the determining, a congestion indication to the first client device, where the congestion indication indicates the first client device to reduce a quantity of I/O requests sent for accessing the first hard disk.

In another possible design, the method further includes receiving a plurality of I/O requests for accessing the first hard disk, and when determining that a size of occupied space in the first buffer region meets a first preset condition, sending, in response to the determining, a congestion indication to a client device that sends at least a part of the plurality of I/O requests, where the congestion indication indicates the client device that receives the congestion indication to reduce a quantity of I/O requests sent for accessing the first hard disk.

In another possible design, the method further includes, when determining that a size of occupied space in the first buffer region meets a second preset condition, sending, in response to the determining, a congestion indication to a client device that sends each of the plurality of I/O requests, where the congestion indication indicates the client device that receives the congestion indication to reduce a quantity of I/O requests sent for accessing the first hard disk.

According to the several possible designs, because each hard disk of the server device is configured with an independent and dedicated buffer region, the server device can control, by using the congestion indication, the client device in a targeted manner to reduce a quantity of I/O requests sent for accessing each hard disk. In addition, by setting different first preset conditions and second preset conditions, the client device may be controlled to reduce, to different degrees, the quantity of I/O requests sent for accessing each hard disk. In this way, congestion of an I/O path when the server device reads/writes each hard disk can be reduced or even avoided.

In another possible design, the congestion indication further indicates a size of an idle buffer region in the first buffer region.

In another possible design, the method further includes sending an I/O response packet to the first client device, where the I/O response packet indicates that the first I/O request has been processed and indicates a size of an idle buffer region in the first buffer region.

According to the two possible designs, the server device may control the client device that receives the congestion indication or the I/O response packet, and determine, based on the size of the idle buffer region in the first buffer region, the quantity and/or a size of the I/O requests sent for accessing the first hard disk, so as to precisely control the quantity and/or the size of the I/O requests sent by the client device.

In another possible design, the method further includes receiving a second I/O request sent by a second client device in the plurality of client devices, where the second I/O request is an I/O request for accessing the first hard disk, and when determining that a buffer required for processing the second I/O request is greater than the size of the idle buffer region in the first buffer region, buffering, in the first buffer region a plurality of times, data that the second I/O request requests to process.

For example, assuming that the second I/O request is an I/O write request that does not carry to-be-written data, when the server device determines that the buffer required for processing the second I/O request is greater than the size of the idle buffer region in the first buffer region, the server device determines to divide the to-be-written data into a plurality of blocks, and reads all the to-be-written data by reading the to-be-written data from the second client device a plurality of times. In this process, the server device buffers, in the first buffer region a plurality of times, the to-be-written data that the second I/O request requests to write. It should be understood that data buffered in the first buffer region each time is a part of the to-be-written data. For another example, assuming that the second I/O request is an I/O read request, when the server device determines that the buffer required for processing the second I/O request is greater than the size of the idle buffer region in the first buffer region, the server device determines to send to-be-read data to the second client device a plurality of times. In this process, the server device buffers the to-be-read data in the first buffer region a plurality of times. It should be understood that data buffered in the first buffer region each time is a part of the to-be-read data.

In this way, according to this possible design, the server device actively controls sizes of read data and written data, thereby improving a success rate of successfully processing an I/O request.

In another possible design, the first buffer region is set in a memory of the server device, or the first buffer region is set in the first hard disk.

According to a second aspect, this application provides a traffic control apparatus.

In a possible design, the traffic control apparatus is configured to perform any method provided in the first aspect. In this application, the traffic control apparatus may be divided into functional modules according to any method provided in the first aspect. For example, each functional module may be divided for each function, or two or more functions may be integrated into one processing module. For example, in this application, the traffic control apparatus may be divided into a receiving unit, a processing unit, and the like based on functions. For descriptions of possible technical solutions and beneficial effects performed by the functional modules obtained through division, refer to the technical solutions provided in the first aspect or the corresponding possible designs of the first aspect. Details are not described herein again.

In another possible design, the traffic control apparatus includes a transmission interface and one or more processors. The one or more processors receive or send data by using the transmission interface. The one or more processors are configured to invoke program instructions stored in a memory, so that the traffic control apparatus performs any method provided in the first aspect and any possible design of the first aspect.

According to a third aspect, this application provides a storage system. The storage system includes a server device and a plurality of client devices, and the server device is configured to perform any method provided in any possible implementation of the first aspect.

According to a fourth aspect, this application provides a computer-readable storage medium. The computer-readable storage medium includes program instructions. When the program instructions are run on a computer or a processor, the computer or the processor is enabled to perform any method provided in any possible implementation of the first aspect.

According to a fifth aspect, this application provides a computer program product. When the computer program product is run on a traffic control apparatus, any method provided in any possible implementation of the first aspect is performed.

According to a sixth aspect, this application provides a chip system, including a processor. The processor is configured to invoke a computer program from a memory and run the computer program stored in the memory, to perform any method provided in the implementations of the first aspect.

It may be understood that any apparatus, computer storage medium, computer program product, chip system, or the like provided above may be used in the corresponding method provided above. Therefore, for beneficial effects that can be achieved, refer to beneficial effects of the corresponding method. Details are not described herein again.

In this application, names of the server device, the client device, the traffic control apparatus, the storage system, and the like constitute no limitation on the devices or the functional modules. In an actual implementation, the devices or the functional modules may have other names. As long as functions of the devices or the functional modules are similar to those in this application, the devices or the functional modules fall within the scope of the claims of this application and equivalent technologies thereof.

BRIEF DESCRIPTION OF DRAWINGS

FIG. 8 is a schematic flowchart of still another traffic control method according to an embodiment of this application; and FIG. 9 is a schematic diagram of a structure of a traffic control apparatus according to an embodiment of this application.

DESCRIPTION OF EMBODIMENTS

Figure 1A:
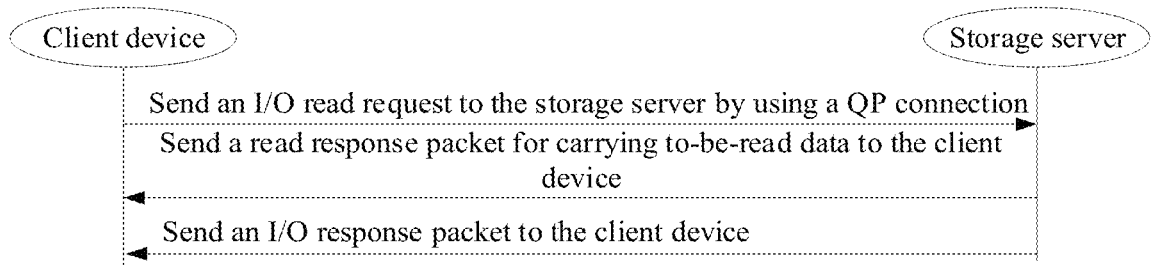
FIG. 1A, FIG. 1B, and FIG. 1C are schematic diagrams of an I/O procedure in which an RDMA-based client device accesses a storage server.

To better understand embodiments of this application, the following describes some terms or technologies in embodiments of this application.

(1) RDMA:

The RDMA is a transport layer network protocol to resolve a data processing delay in network transmission. The RDMA protocol supports a plurality of RDMA operations. The RDMA operations are for achieving an objective that a request end device directly stores (or writes) or reads a memory of a respond end device. An RDMA operation request can bypass a CPU running an operating system, and can implement zero-copy transmission of data between the request end device and the respond end device by using a network, so that when data is transmitted based on the RDMA operations, CPU usage can be reduced, and a data transmission delay can be reduced.

In a mainstream implementation of the protocol, a QP is generally used to send and receive data. One QP includes one send queue (SQ) and one receive queue (RQ). The SQ includes at least one send queue element (SQE), and one SQE indicates one RDMA operation of the request end device. The RQ includes at least one receive queue element (RQE), and one RQE indicates the respond end device to process one RDMA message. Both the SQ and the RQ are first input first output queues.

The RDMA operation includes a send operation for sending data in the request end device to the respond end device, a read operation for reading data in the respond end device by the request end device, a write operation for writing data in the request end device into the respond end device, and the like.

(2) Related Technical Description of RDMA Used for Storage Field:

When the RDMA is used for the storage field, for example, a client device accesses a storage device by using the RDMA, both the client device and the storage device need to be configured with an NIC having an RDMA function (the NIC having the RDMA function is referred to as an RNIC), and the client device and the storage device separately pre-allocate, to respective RNICs, buffer regions for buffering data. In this way, after a QP connection is established between the client device and the storage device, data may be transmitted based on the QP connection.

It may be understood that the client device may be used as an RDMA request end device, or may be used as an RDMA respond end device. When the client device is used as an RDMA request end device, the storage device may be used as an RDMA respond end device. When the client device is used as an RDMA respond end device, the storage device may be used as an RDMA request end device. This is not limited.

The client device may be an application server, and the storage device may be a storage server in a centralized storage system, or may be any storage device in a distributed storage system. Details about the centralized storage system and the distributed storage system are not described herein.

An example in which the storage device is a storage server in a centralized storage system is used below to briefly describe an I/O procedure in which the client device accesses the storage server based on the RDMA.

Figure 1B:
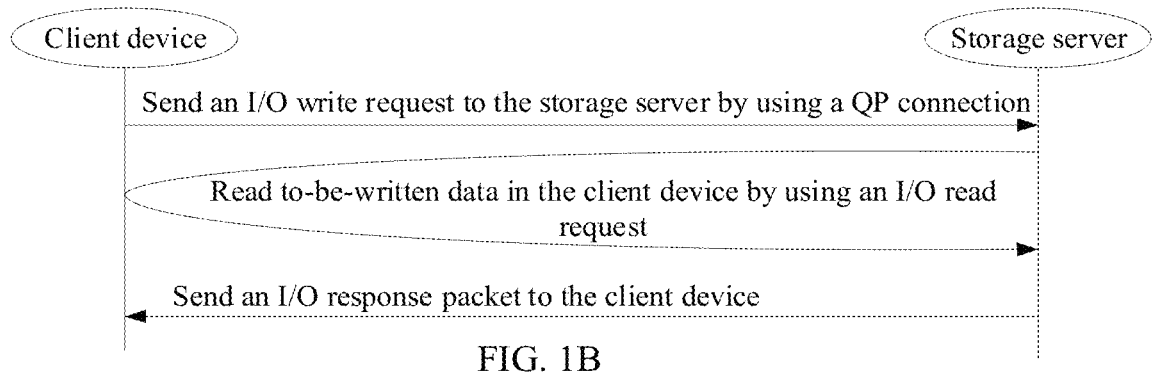
Figure 1C:
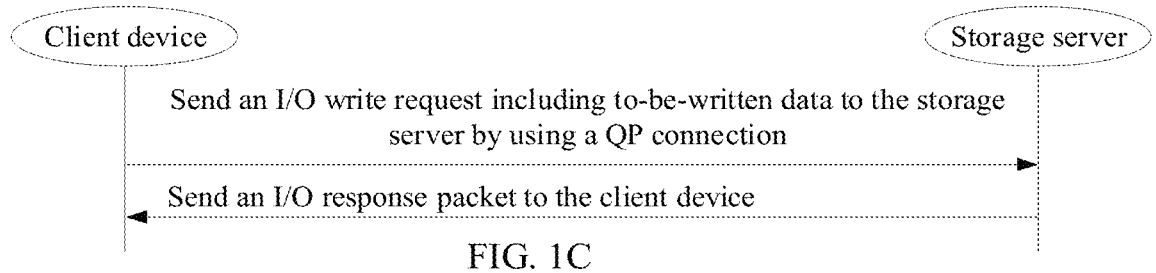

Refer to FIGS. 1A, 1B, and 1C, FIGS. 1A, 1B, and 1C are schematic diagrams of an I/O procedure in which an RDMA-based client device accesses a storage server.

As shown in in FIG. 1A, FIG. 1A shows a schematic diagram of an I/O procedure in which an RDMA-based client device reads data in a storage server.

When the client device requests to read data in the storage server, an RNIC of the client device first sends an I/O read request to the storage server by using a QP connection. The I/O read request requests to read the data stored in the storage server. The I/O read request includes a storage address of to-be-read data in the storage server, a size of the to-be-read data, and an address that is in the client device and that is for receiving the to-be-read data. It should be understood that the storage address of the to-be-read data in the storage server includes an identifier of storage space that is in the storage server and that is for storing the to-be-read data, and an address (including a physical address or a logical address) of the to-be-read data stored in the storage space identified by the identifier. As an example, the storage space may be a hard disk, or may be a partition of a hard disk. This is not limited herein. For ease of description, in the following embodiments of this application, an example in which the storage space is a hard disk is used for description.

In response, an RNIC of the storage server receives the I/O read request, and reserves a buffer region based on the size of the to-be-read data in the I/O read request. Then, the storage server writes the to-be-read data into the reserved buffer region based on the storage address that is in the storage server and that is for storing the to-be-read data and that is carried in the I/O read request, and generates, based on the to-be-read data in the buffer region, an I/O write packet for carrying the to-be-read data. The I/O write packet further includes the address that is in the client device and that is for receiving the to-be-read data. It may be understood that the I/O write packet for carrying the to-be-read data is a read response packet of the I/O read request. Then, the RNIC of the storage server sends the read response packet to the client device, so that the RNIC of the client device writes the to-be-read data into the address for receiving the to-be-read data.

Then, after sending the read response packet carrying the to-be-read data, the RNIC of the storage server further sends an I/O response packet to the client device, to notify the client device that the to-be-read data has been sent.

As shown in FIG. 1B, FIG. 1B shows a schematic diagram of an I/O procedure in which an RDMA-based client device writes data into a storage server.

When the client device requests to write data into the storage server, an RNIC of the client device first sends an I/O write request to the storage server by using a QP connection, where the I/O write request requests to write data into the storage server, and the I/O write request includes an address that is in the client device and that is for storing to-be-written data and a size of the to-be-written data.

In response, the storage server receives the I/O write request, reserves, based on the size of the to-be-written data in the I/O write request, a buffer region for buffering the to-be-written data, and allocates a target address for storing the to-be-written data. The target address includes an identifier of target storage space that is in the storage server and that is for storing the to-be-written data and an address that is in the target storage space and that is for writing the to-be-written data. Herein, for descriptions of the target storage space, refer to the foregoing descriptions of the storage space. Details are not described again. For ease of description, in the following embodiments of this application, an example in which the target storage space is a target hard disk is used for description.

Then, an RNIC of the storage server sends an I/O read request to the client device based on the address that is in the client device and that is for storing the to-be-written data and the target address that is in the storage server and that is for storing the to-be-written data that are carried in the I/O write request, so as to request to read the to-be-written data in the client device. When receiving a read response packet sent by the client device, the RNIC of the storage server writes the to-be-written data carried in the read response packet into the reserved buffer region, and notifies a corresponding hard disk to persistently store the to-be-written data into the target address, thereby implementing persistent storage of the to-be-written data written by the client device. For a process in which the client device processes the received I/O read request, refer to the foregoing description of the process in which the storage server processes the I/O read request. Details are not described herein again.

Then, after the storage server completes persistent storage of the to-be-written data, the storage server sends an I/O response packet to the client device, to notify the client device that persistent storage of the to-be-written data has been completed.

As shown in FIG. 1C, FIG. 1C shows another schematic diagram of an I/O procedure in which an RDMA-based client device writes data into a storage server.

When the client device requests to write data into the storage server, an RNIC of the client device first sends an I/O write request to the storage server by using a QP connection. The I/O write request requests to write data into the storage server. The I/O write request includes to-be-written data, a size of the to-be-written data, and a target address that is in the storage server and that is for writing the to-be-written data. For descriptions of the target address, refer to the foregoing descriptions. Details are not described again. It can be learned that the I/O write request carries the to-be-written data. Therefore, the I/O write request is an RDMA write request with an immediate.

In response, an RNIC of the storage server receives the I/O write request, and reserves, based on the size of the to-be-written data in the I/O write request, a buffer region for buffering the to-be-written data. Then, the RNIC of the storage server writes the to-be-written data carried in the I/O write request into the reserved buffer region, and notifies a corresponding hard disk to persistently store the to-be-written data into the target address, thereby implementing persistent storage of the to-be-written data written by the client device.

Then, after the storage server completes persistent storage of the to-be-written data, the storage server sends an I/O response packet to the client device, to notify the client device that persistent storage of the to-be-written data has been completed.

The following briefly describes a process in which the storage server processes a received I/O request when the client device accesses the storage server.

Figure 2:
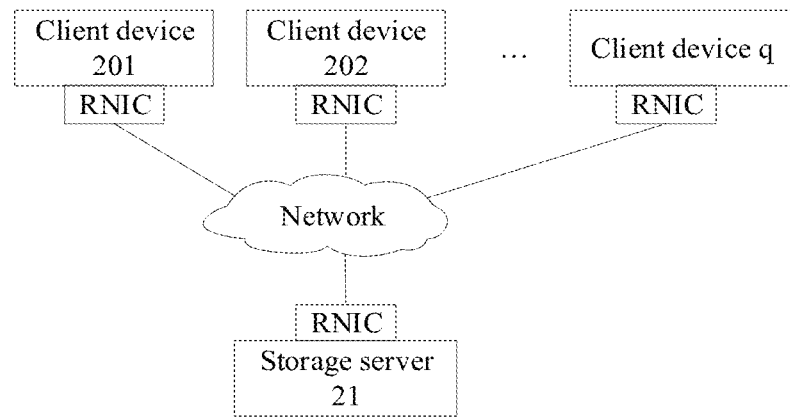
FIG. 2 is a schematic diagram of a network system according to an embodiment of this application.

Refer to FIG. 2, FIG. 2 is a schematic diagram of a network system. As shown in FIG. 2, the network system shown in FIG. 2 includes a storage server 21, and the storage server 21 includes a plurality of hard disks. The network system further includes a plurality of client devices (including a client device 201, a client device 202, . . . , and a client device q, where q is a positive integer) that can access the storage server 21. RNICs are configured for the storage server 21 and the plurality of client devices, buffer regions are configured for the respective RNICs of the storage server 21 and the plurality of client devices, QP connections are separately established between the plurality of client devices and the storage server 21, and the plurality of client devices communicate with the storage server through a network.

In a case, when the client device (for example, the client device 201) requests to write to-be-written data into the storage server 21, the RNIC of the storage server 21 may receive a read response packet (that is, the read response packet described in FIG. 1B) carrying the to-be-written data, or receive an I/O write request (that is, the I/O write request described in FIG. 1C) carrying the to-be-written data. For example, the RNIC of the storage server 21 receives an I/O write request carrying the to-be-written data. In this case, the RNIC of the storage server 21 first reserves a buffer region based on a size of the to-be-written data carried in the received I/O write request, and writes the to-be-written data carried in the I/O write request into the reserved buffer region. Then, the storage server 21 further performs the following procedure:

S11. The RNIC of the storage server 21 determines, based on an identifier carried in a target address in the I/O write request, a target hard disk for writing the to-be-written data and a first target queue.

For related descriptions of the target address, refer to the foregoing descriptions. Details are not described herein again.

The first target queue is a queue of the target hard disk. It should be understood that a hard disk is usually configured with a plurality of queues. Therefore, the RNIC of the storage server 21 may determine the first target queue from a plurality of queues of the target hard disk in a polling manner, a hash manner, or a random manner.

It should be further understood that a queue element (QE) written by an RNIC in any queue of the hard disk indicates the hard disk to perform an operation such as read/write/delete.

S12. The RNIC of the storage server 21 writes a first QE into the first target queue, and sends a notification message to the target hard disk.

The first QE includes an address of the buffer region for buffering the to-be-written data and an address that is in the target hard disk and that is for writing the to-be-written data, and indicates the target hard disk to persistently write the to-be-written data buffered in the buffer region into the target hard disk.

The notification message notifies the target hard disk to process the first QE in the first target queue. For example, the notification message is, for example, a doorbell message.

S13. The target hard disk receives the notification message, and processes the first QE in the first target queue, so as to persistently write the to-be-written data buffered in the buffer region into an address that is in the target hard disk and that is for writing the to-be-written data.

S14. The target hard disk writes a first completion queue element (CQE) into a completion queue (CQ), where the first CQE indicates that the target hard disk has completed persistent storage of all the to-be-written data buffered in the buffer region.

It should be understood that, after all the to-be-written data buffered in the buffer region is persistently written into the target hard disk, the target hard disk writes the first CQE into the CQ.

Optionally, the first CQE includes the address of the buffer region for buffering the to-be-written data.

Optionally, the first CQE includes indication information that can be used to determine the address of the buffer region for buffering the to-be-written data. For example, the indication information is a transaction sequence number of the current I/O request. This is not limited herein.

S15. The target hard disk sends a notification message to the RNIC of the storage server 21, to notify the RNIC to process the first CQE in the CQ.

The notification message is, for example, a doorbell message. This is not limited herein.

In this way, after receiving the notification message, the RNIC of the storage server 21 sequentially processes CQEs in the CQ based on a first in first out order. When processing the first CQE in the CQ, the RNIC of the storage server 21 clears and recycles the buffer region indicated by the first CQE.

It may be understood that the recycled buffer region may be used to buffer to-be-written data/to-be-read data requested by a subsequent I/O request.

S16. The RNIC of the storage server 21 sends an I/O response packet to the client device 201, to notify the client device 201 that persistent storage of the to-be-written data is completed.

In another case, when the client device (for example, the client device 201) requests to read data stored in the storage server 21, the RNIC of the storage server 21 receives an I/O read request sent by the client device 201. Then, the RNIC of the storage server 21 reserves a buffer region based on a size of to-be-read data indicated by the I/O read request. Then, the storage server 21 further performs the following procedure:

S21. The RNIC of the storage server 21 determines, based on an identifier of a hard disk indicated by a storage address in the I/O read request, a target hard disk for storing the to-be-read data and a second target queue.

The storage address in the I/O read request is a storage address of the to-be-read data in the storage server. For detailed descriptions, refer to the related descriptions of the I/O read request in FIG. 1A. For related descriptions of the second target queue, refer to the foregoing descriptions of the first target queue. Details are not described again.

S22. The RNIC of the storage server 21 writes a second QE into the second target queue, and sends a notification message to the target hard disk.

The second QE includes an address of the buffer region reserved for the to-be-read data and an address that is in the target hard disk and that is for storing the to-be-read data, and indicates the target hard disk to write the to-be-read data into the reserved buffer region. For descriptions of the notification message, refer to the foregoing descriptions. Details are not described herein again.

S23. The target hard disk receives the notification message, and processes the second QE in the second target queue, to write the to-be-read data into the reserved buffer region.

S24. The target hard disk writes a second CQE into a CQ, where the second CQE indicates that the target hard disk has written all the to-be-read data into the buffer region.

It should be understood that after writing all the to-be-read data into the buffer region, the target hard disk writes the second CQE into the CQ.

Optionally, the second CQE includes the address of the buffer region for buffering the to-be-read data.

Optionally, the second CQE includes indication information that can be used to determine the address of the buffer region for buffering the to-be-read data. For example, the indication information is a transaction sequence number of the current I/O request. This is not limited.

S25. The hard disk sends a notification message to the RNIC of the storage server 21, to notify the RNIC to process the second CQE in the CQ.

The notification message is, for example, a doorbell message. This is not limited herein.

In this way, after receiving the notification message, the RNIC of the storage server 21 sequentially processes CQEs in the CQ based on a first in first out order. When processing the second CQE in the CQ, the RNIC of the storage server 21 sends, by using a read response packet, the to-be-read data buffered in the buffer region indicated by the second CQE to the client device 201 by using the QP connection, and after sending of the to-be-read data is completed, clears and recycles the buffer region for buffering the to-be-read data. It may be understood that the recycled buffer region may be used to buffer to-be-written data/to-be-read data requested by a subsequent I/O request.

S26. The RNIC of the storage server 21 sends an I/O response packet to the client device 201, to notify the client device that the to-be-read data has been sent.

(3) Other Terms:

The term "exemplary" or "for example" in embodiments of this application represents giving an example, an illustration, or a description. Any embodiment or design scheme described as "exemplary" or "for example" in embodiments of this application should not be explained as being more preferred or having more advantages than another embodiment or design scheme. The use of the word "exemplary", "for example", or the like is intended to present a related concept in a specific manner.

In embodiments of this application, the terms "first" and "second" are merely used for a purpose of description, and shall not be understood as indicating or implying relative importance or implicitly indicating a quantity of indicated technical features. Therefore, a feature limited by "first" or "second" may explicitly or implicitly include one or more of the features.

The term "at least one" in this application means one or more, and the term "a plurality of" in this application means two or more.

It should be understood that "one embodiment", "an embodiment", and "a possible implementation" mentioned throughout the specification mean that particular features, structures, or characteristics related to the embodiment or the implementation are included in at least one embodiment of this application. Therefore, "in one embodiment", "in an embodiment", or "a possible implementation" that appears throughout the specification does not necessarily refer to a same embodiment. In addition, these particular features, structures, or characteristics may be combined in one or more embodiments in any suitable manner.

Generally, the client device accesses the storage server based on the RDMA, and all I/O requests received by the storage server share one buffer region. Therefore, when any hard disk in a plurality of hard disks connected to one QP of the RNIC of the storage server is slow in reading/writing, a buffer region for buffering to-be-read/to-be-written data this time is continuously occupied and cannot be recycled for use of other I/O requests in time. As a result, reading and writing of other I/O requests for other hard disk are slowed down, and overall performance of the storage system deteriorates.

In addition, because the storage server may be generally accessed by a large quantity of client devices, when a client device sends a large quantity of I/O requests to the storage server in a short time, the storage server may fully occupy all the buffer region to process the I/O requests of the client device. Consequently, I/O requests sent by other client devices to the storage server cannot be processed, leading to a problem that available resources are not uniformly distributed occurring when a plurality of client devices access the storage server.

In addition, because a transmission bandwidth of the RNIC of the storage server is usually greater than a read and write bandwidth of the hard disk, when the RNIC of the storage server receives a large quantity of I/O requests, the hard disk cannot perform read and write operations in time. Consequently, congestion occurs on an I/O path of the storage server.

Based on this, an embodiment of this application provides a traffic control method. The method is used for a server device that provides a storage service in a storage system. In the traffic control method provided in this embodiment of this application, the server device pre-allocates an independent buffer region to each hard disk. For example, the server device allocates a dedicated first buffer region to a first hard disk, where the first buffer region uniquely corresponds to the first hard disk, and is only for buffering data that an I/O request for accessing the first hard disk requests to process. In this way, when receiving a first I/O request for accessing the first hard disk, an RNIC of the server device processes the first I/O request based on the first buffer region.

In this way, even if the server device is slow in reading and writing a hard disk, a speed of reading and writing another hard disk by the server device is not affected, thereby ensuring overall performance of the storage system. In addition, when a plurality of client devices accesses different hard disks on the server device, the plurality of client devices does not affect each other, that is, when the plurality of client devices accesses the server device, a problem that available resources are not uniformly distributed does not occur. In addition, according to the method in this embodiment of this application, when a large amount of space has been occupied in the first buffer region of the server device, the client device is further notified in time to reduce a quantity of I/O requests sent for accessing the first hard disk, so that a problem of congestion occurring on an I/O path for reading and writing the first hard disk by the server device is avoided in a targeted manner.

An embodiment of this application further provides a server device. The foregoing traffic control method is used for the server device. The server device may be a storage server in a centralized storage system, or may be any storage device in a distributed storage system. This is not limited herein. Detailed descriptions of the centralized storage system and the distributed storage system are not provided herein.

The server device includes or is connected to a plurality of hard disks, and the server device pre-allocates a corresponding buffer region to each hard disk, so as to buffer data when reading/writing each hard disk. In other words, each hard disk in the server device uniquely corresponds to one buffer region. For any hard disk of the server device, a buffer region corresponding to the hard disk is dedicated to buffering data when the hard disk is read/written.

As an example, assuming that a size of an I/O buffer required by a single hard disk when a bandwidth is full is 32 megabytes (MB), the server device may allocate a buffer region greater than or equal to 32 MB to each hard disk, so as to meet optimal read and write performance of a single hard disk.

Optionally, the server device may allocate, in a memory, a unique and corresponding buffer region to each hard disk.

Optionally, for any hard disk included in or connected to the server device, the server device uses a reserved region in the hard disk as a buffer region of the hard disk.

Figure 3:
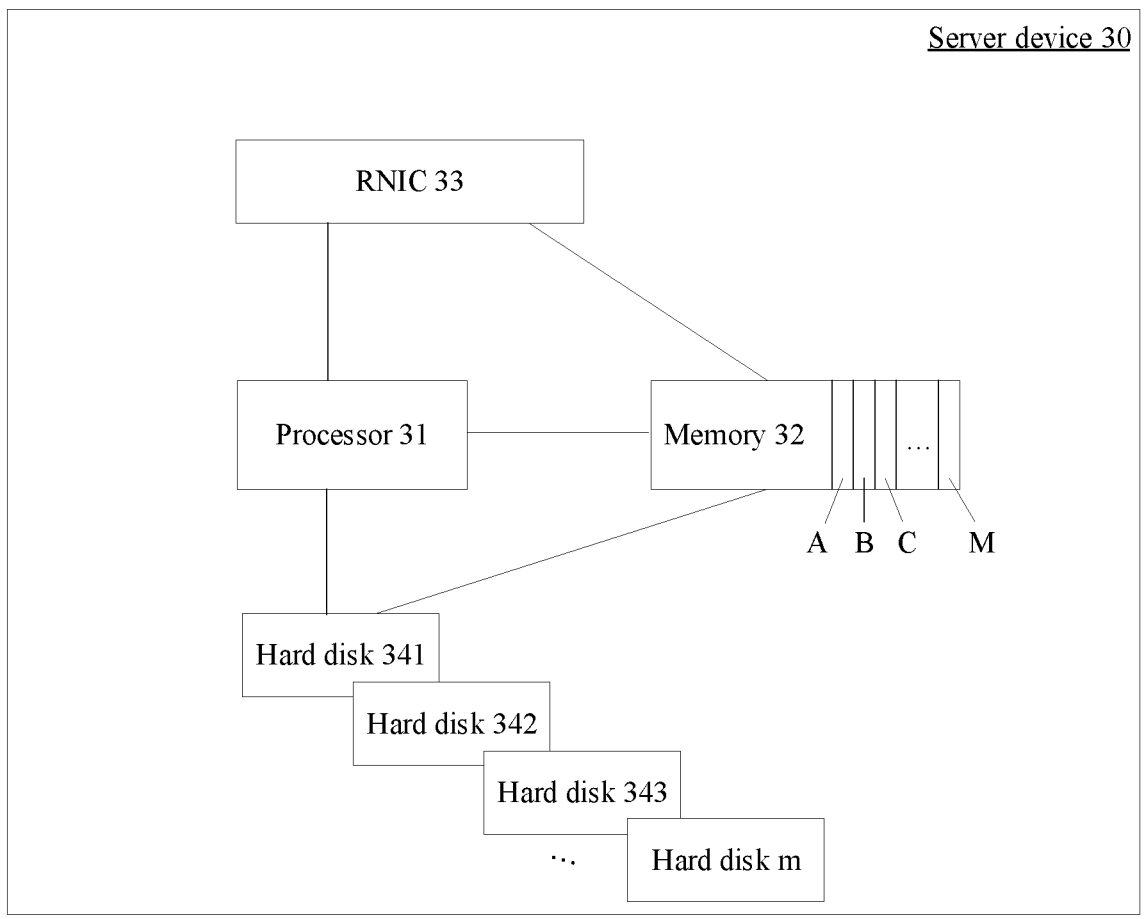
FIG. 3 is a schematic diagram of a hardware structure of a server device according to an embodiment of this application.

For example, refer to FIG. 3, FIG. 3 is a schematic diagram of a hardware structure of a server device according to an embodiment of this application. As shown in FIG. 3, the server device 30 includes a processor 31, a memory 32, an RNIC 33, and m hard disks. The m hard disks include a hard disk 341, a hard disk 342, a hard disk 343, . . . , and a hard disk m, where m is a positive integer. The memory 32, the RNIC 33, and the m hard disks are separately connected to and communicate with the processor 31, the memory 32 is connected to and communicates with the RNIC 33, and the m hard disks are separately connected to and communicate with the memory 32.

The processor 31 is a control center of the server device 30, and may be a general-purpose CPU. Alternatively, the processor 31 may be another general-purpose processor, a digital signal processor (DSP), an application-specific integrated circuit (ASIC), a field-programmable gate array (FPGA) or another programmable logic device, a discrete gate or transistor logic device, a discrete hardware component, a graphics processing unit (GPU), a neural network processing unit (NPU), a tensor processing unit (TPU) or an artificial intelligence chip, or a data processing unit (DPU).

In an example, the processor 31 includes one or more CPUs. For example, the processor 31 includes a CPU 0 and a CPU 1. In addition, a quantity of processor cores in each processor is not limited in this application.

The memory 32 is configured to store program instructions or data to be accessed by an application process, and the processor 31 may execute the program instructions in the memory 32.

The memory 32 includes a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), which is used as an external cache. Through example but not limitative description, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct Rambus (DR) RAM. The non-volatile memory may be a storage class memory (SCM), a solid-state drive (SSD), or a hard disk drive (HDD). The SCM may be, for example, a non-volatile memory (NVM), a phase-change memory (PCM), or a persistent memory.

In a possible implementation, the memory 32 is independent of the processor 31. The memory 32 is connected to the processor 31 by using a bus, and is configured to store data, instructions, or program code. The processor 31 can invoke and execute the instructions or the program code stored in the memory 32.

In another possible implementation, the memory 32 and the processor 31 are integrated together.

In addition, as shown in FIG. 3, m segments of space (including space A, space B, space C, . . . , and space M) are reserved in the memory 32, and the m segments of space are respectively set as buffer regions of the m hard disks. It should be noted that the m hard disks are in a one-to-one correspondence with the m segments of space. For example, assuming that the space A uniquely corresponds to the hard disk 341, the space A is a buffer region of the hard disk 341, and is dedicated to buffering data (for example, to-be-read data or to-be-written data) that needs to be buffered when a client device accesses the hard disk 341. For another example, assuming that the space B uniquely corresponds to the hard disk 342, the space B is a buffer region of the hard disk 342, and is dedicated to buffering data (for example, to-be-read data or to-be-written data) that needs to be buffered when a client device accesses the hard disk 342.

The RNIC 33 is a communication interface of the server device 30. The communication interface is used by the server device 30 to connect to another device (such as a client device) by using a communication network. The communication network may be an Ethernet that supports RDMA or the like. The communication interface includes a receiving unit configured to receive data/packets and a sending unit configured to send data/packets.

The m hard disks are configured to store data, for example, store service data of a client device. It may be understood that the hard disk herein may be an HDD, or may be an SSD. This is not limited herein.

It should be noted that the structure shown in FIG. 3 does not constitute a limitation on the server device 30. In addition to the components shown in FIG. 3, the server device 30 includes more or fewer components than those shown in FIG. 3, or combines some components, or has a different component arrangement.

Figure 4:
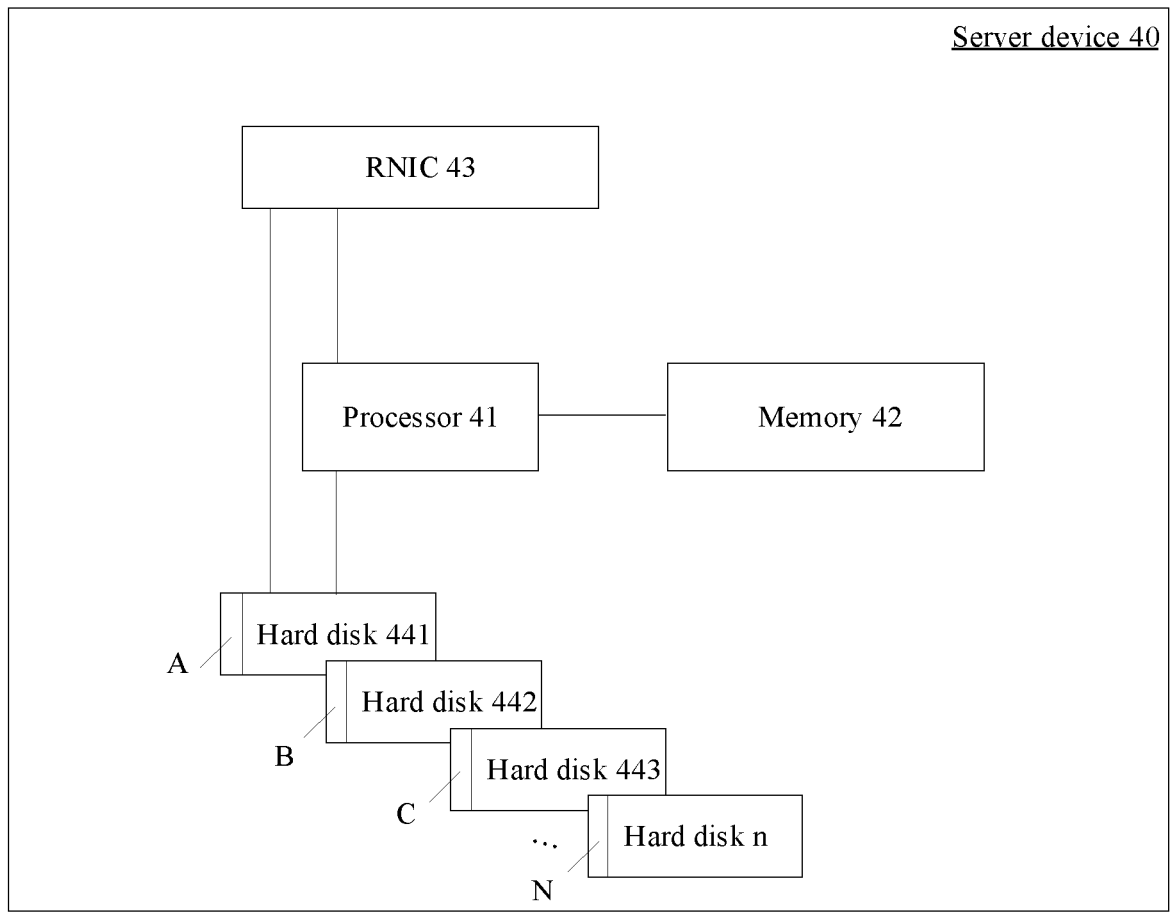
FIG. 4 is a schematic diagram of a hardware structure of another server device according to an embodiment of this application.

For another example, refer to FIG. 4, FIG. 4 is a schematic diagram of a hardware structure of another server device according to an embodiment of this application. As shown in FIG. 4, the server device 40 includes a processor 41, a memory 42, an RNIC 43, and n hard disks. The n hard disks include a hard disk 441, a hard disk 442, a hard disk 443, . . . , and a hard disk n. The memory 42, the RNIC 43, and the n hard disks are respectively connected to and communicate with the processor 41, and the n hard disks are respectively connected to and communicate with the RNIC 43.

For descriptions of the processor 41, refer to the foregoing descriptions of the processor 31. Details are not described again.

For descriptions of the memory 42, refer to the foregoing related descriptions of the memory 32. It should be noted that no buffer region is set for the m hard disks in the memory 42.

For descriptions of the RNIC 43, refer to the foregoing descriptions of the RNIC 33. Details are not described again.

For descriptions of the n hard disks, refer to the foregoing descriptions of the m hard disks. It should be noted that, a segment of space is reserved in each of the n hard disks in the server device 40, to serve as a buffer region of each hard disk.

For example, space A is reserved in the hard disk 441, and the space A is used as a buffer region of the hard disk 441, and is dedicated to buffering data that needs to be buffered when a client device accesses the hard disk 441. Similarly, space B reserved in the hard disk 442 is used as a buffer region of the hard disk 442, space C reserved in the hard disk 443 is used as a buffer region of the hard disk 443, and space N reserved in the hard disk n is used as a buffer region of the hard disk n.

It should be further noted that the structure shown in FIG. 4 does not constitute a limitation on the server device 40. In addition to the components shown in FIG. 4, the server device 40 includes more or fewer components than those shown in FIG. 4, or combines some components, or has a different component arrangement.

An embodiment of this application further provides a traffic control apparatus. The traffic control apparatus may be the foregoing server device, or may be a functional module in the foregoing server device, where the functional module is, for example, an RNIC of the server device. This is not limited herein.

Figure 5:
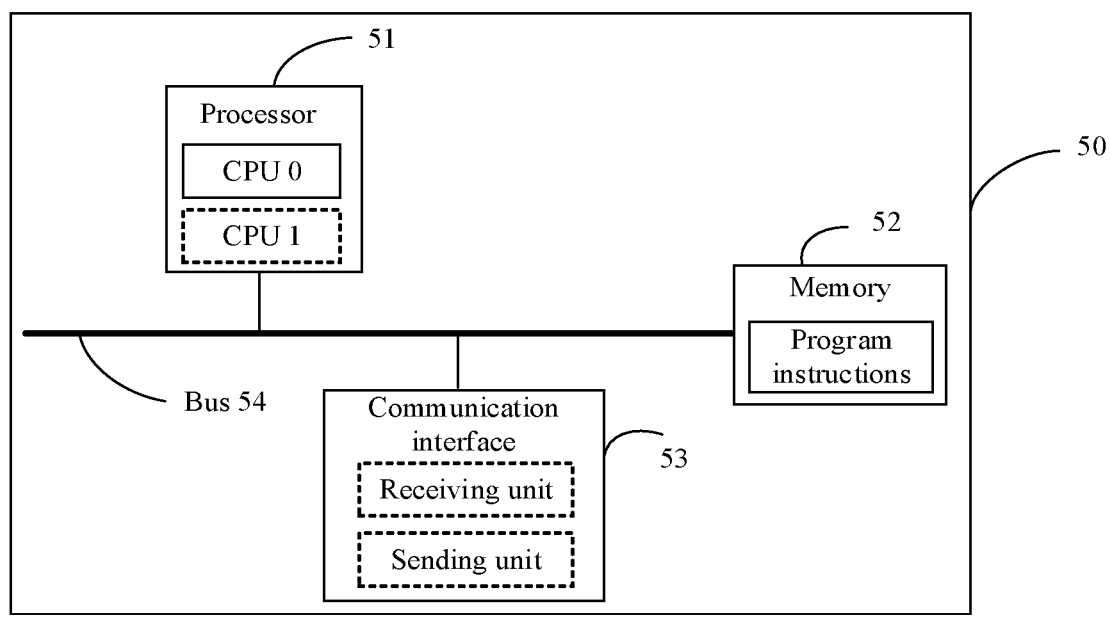
FIG. 5 is a schematic diagram of a hardware structure of a traffic control apparatus according to an embodiment of this application.

Refer to FIG. 5, FIG. 5 is a schematic diagram of a hardware structure of a traffic control apparatus according to an embodiment of this application. As shown in FIG. 5, the traffic control apparatus 50 includes a processor 51, a memory 52, a communication interface 53, and a bus 54. The processor 51, the memory 52, and the communication interface 53 are connected by using the bus 54.

For descriptions of the processor 51, refer to the foregoing descriptions of the processor 31. Details are not described again. In an example, the processor 31 includes one or more CPUs, for example, a CPU 0 and a CPU 1 shown in FIG. 5. In addition, a quantity of processor cores in each processor is not limited in this application.

For descriptions of the memory 52, refer to the foregoing descriptions of the memory 31. It should be noted that, the memory 52 is not provided with a buffer region required for accessing a hard disk. The memory 52 is configured to store program instructions or data to be accessed by an application process. The processor 51 may execute the program instructions in the memory 52, to implement the traffic control method provided in embodiments of this application.

The communication interface 53 includes a receiving unit configured to receive data/packets and a sending unit configured to send data/packets. For detailed descriptions of the communication interface 53, refer to the foregoing descriptions of the communication interface. Details are not described again.

The bus 54 may be an Industry Standard Architecture (ISA) bus, a Peripheral Component Interconnect (PCI) bus, a PCI Express (PCIe) bus, a Compute Express Link (CXL) bus, or an Extended ISA (EISA) bus. The bus may be classified into an address bus, a data bus, a control bus, and the like. For ease of representation, only one bold line is used to represent the bus in FIG. 5, but this does not mean that there is only one bus or only one type of bus.

It should be noted that the structure shown in FIG. 5 does not constitute a limitation on the traffic control apparatus 50. In addition to the components shown in FIG. 5, the traffic control apparatus 50 includes more or fewer components than those shown in FIG. 5, or combines some components, or has a different component arrangement.

An embodiment of this application further provides a network system. The network system includes a server device having the structure shown in FIG. 3 or FIG. 4. For example, the server device is a storage server. In this case, the network system provided in this embodiment of this application is the network system shown in FIG. 2. Details are not described again.

The following describes in detail the traffic control method provided in embodiments of this application with reference to the accompanying drawings.

Figure 6:
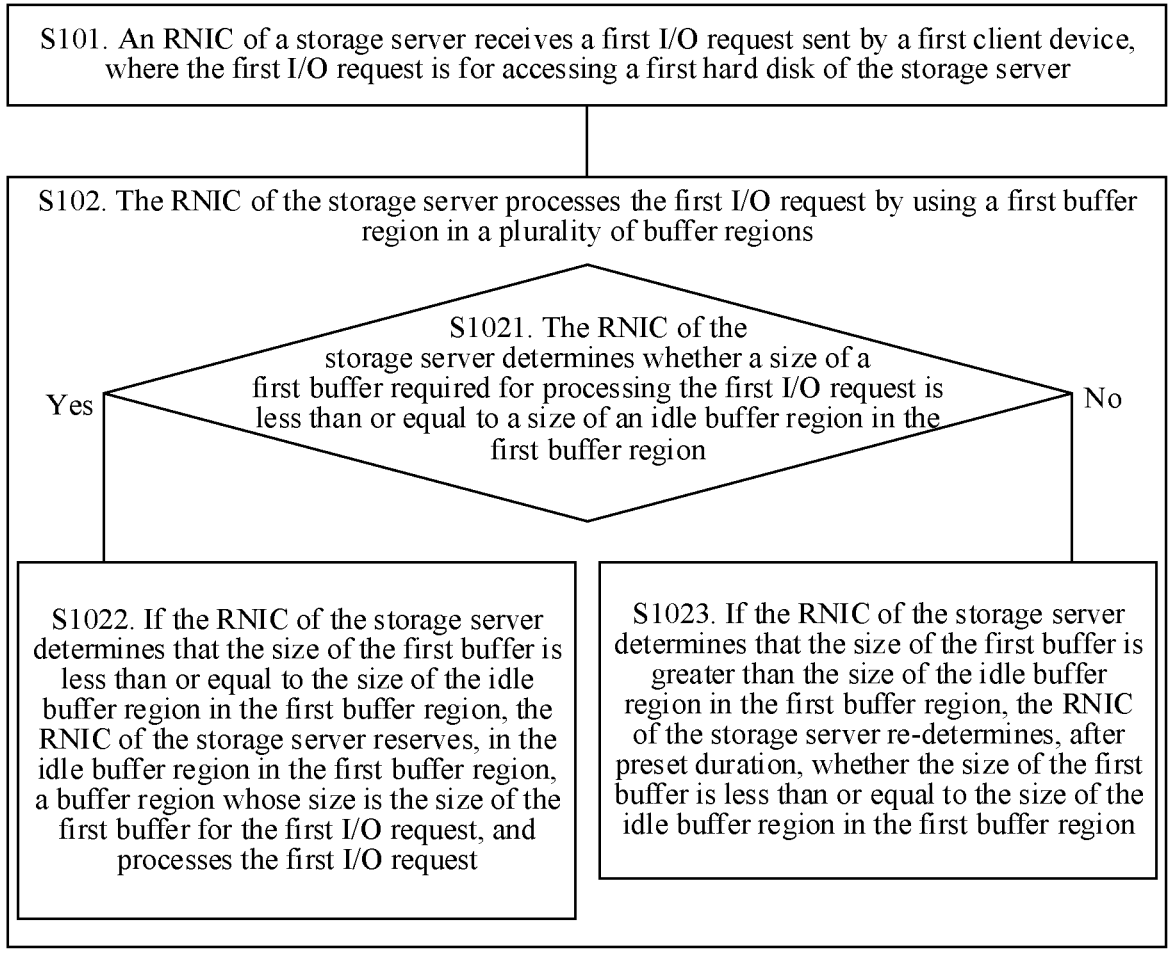
FIG. 6 is a schematic flowchart of a traffic control method according to an embodiment of this application.

Refer to FIG. 6, FIG. 6 is a schematic flowchart of a traffic control method according to an embodiment of this application. The method is used for a server device having the structure shown in FIG. 3 or FIG. 4. Optionally, an example in which the server device is a storage server in a centralized storage system is used. In this case, the method is further used for a storage server that is in the network system shown in FIG. 2 and has the structure shown in FIG. 3 or FIG. 4. The method includes the following steps.

S101. An RNIC of the storage server receives a first I/O request sent by a first client device, where the first I/O request is for accessing a first hard disk of the storage server.

The first client device is any one of a plurality of client devices that establish a QP connection to the storage server. For example, the first client device may be any one of the client device 201, the client device 202, or the client device q shown in FIG. 2. This is not limited herein.

Optionally, the first client device may be any device that needs to access the storage server. For example, the first client device may be an application server.

Optionally, the first I/O request may be an I/O read request that the first client device requests to read data in the first hard disk in the storage server. Alternatively, the first I/O request may be an I/O write request that the first client device requests to write data into the first hard disk of the storage server. For descriptions of the I/O read request and the I/O write request, refer to the related descriptions of the I/O read request and the I/O write request in FIG. 1. Details are not described herein again.

It can be learned from the foregoing content described in FIG. 2 that the I/O request received by the storage server 21 carries an identifier of a hard disk. Therefore, after receiving the first I/O request, the RNIC of the storage server may determine, based on an identifier of a hard disk carried in the first I/O request, that a hard disk that the first I/O request requests to access is the hard disk identified by the identifier. When the hard disk identified by the identifier carried in the first I/O request is the first hard disk, the hard disk that the first I/O request requests to access is the first hard disk. For related descriptions of the identifier of the hard disk, refer to the foregoing descriptions. Details are not described herein again.

The first hard disk may be disposed inside the storage server, or may be disposed outside the storage server. This is not limited herein. For example, assuming that the storage server is the server device 30 shown in FIG. 3, the first hard disk may be any one of the hard disk 341, the hard disk 342, the hard disk 343, . . . , or the hard disk m of the server device 30 shown in FIG. 3. Assuming that the storage server is the server device 40 shown in FIG. 4, the first hard disk may be any one of the hard disk 441, the hard disk 442, the hard disk 443, . . . , or the hard disk n of the server device 40 shown in FIG. 4.

S102. The RNIC of the storage server processes the first I/O request by using a first buffer region in a plurality of buffer regions.

The plurality of buffer regions is respectively for buffering data that I/O requests for accessing a plurality of hard disks of the storage server request to process. The first buffer region in the plurality of buffer regions is dedicated to buffering data that I/O requests for accessing the first hard disk of the storage server request to process. For ease of description, in embodiments of this application, data that an I/O request requests to process is referred to as data of the I/O request below.

For example, if the storage server is the server device 30 shown in FIG. 3, the plurality of buffer regions includes the space A, the space B, the space C, . . . , and the space M in the memory 32 of the server device 30. Assuming that the first hard disk is the hard disk 341 of the server device 30, the first buffer region is the space A.

For another example, if the storage server is the server device 40 shown in FIG. 4, the plurality of buffer regions include the segment of storage space in each hard disk of the server device 30, for example, include the space A in the hard disk 441, the space B in the hard disk 442, the space C in the hard disk 443, . . . , and the space N in the hard disk n. Assuming that the first hard disk is the hard disk 441 of the server device 40, the first buffer region is the space A in the hard disk 441.

Optionally, a process in which the RNIC of the storage server processes the first I/O request by using the first buffer region may include the following steps.

S1021. The RNIC of the storage server determines whether a size of a first buffer required for processing the first I/O request is less than or equal to a size of an idle buffer region in the first buffer region.

The first buffer region uniquely corresponds to the first hard disk, and is dedicated to buffering data (for example, to-be-read data or to-be-written data) that needs to be buffered when the first hard disk is accessed.

It should be understood that, assuming that the first I/O request is an I/O read request, the size of the first buffer is a size of to-be-read data carried in the first I/O request. Assuming that the first I/O request is an I/O write request, the size of the first buffer is a size of to-be-written data carried in the first I/O request.

It should be further understood that the idle buffer region in the first buffer region is a buffer region that is not reserved in the first buffer region for another I/O request for accessing the first hard disk at a current moment, and a buffer region that currently buffers data of I/O requests for accessing the first hard disk. Herein, for related descriptions of reserving a buffer region for an I/O request, refer to the foregoing descriptions. Details are not described herein again.

Optionally, the first buffer region may be located in a memory of the storage server, or may be located in the first hard disk. This is not limited herein.

If the RNIC of the storage server determines that the size of the first buffer is less than or equal to the size of the idle buffer region in the first buffer region, S1022 is performed.

If the RNIC of the storage server determines that the size of the first buffer is greater than the size of the idle buffer region in the first buffer region, S1023 is performed.

S1022. If the RNIC of the storage server determines that the size of the first buffer is less than or equal to the size of the idle buffer region in the first buffer region, the RNIC of the storage server reserves, in the idle buffer region in the first buffer region, a buffer region whose size is the size of the first buffer for the first I/O request, and processes the first I/O request.

In a possible case, if the first I/O request is an I/O write request, and the first I/O request carries to-be-written data (that is, the I/O write request is a write request with an immediate), the RNIC of the storage server writes the to-be-written data carried in the first I/O request to the reserved buffer region, and further processes the first I/O request with reference to the procedure described in S11 to S16 above, to implement persistent storage of the to-be-written data carried in the first I/O request. Details are not described herein again.

In another possible case, if the first I/O request is an I/O write request, and the first I/O request does not carry to-be-written data, after reserving the required buffer region for the first I/O request, the RNIC of the storage server sends an I/O read request to the first client device to request to read the to-be-written data in the client device. When receiving a read response packet that carries the to-be-written data and that is sent by the client device, the RNIC of the storage server writes the to-be-written data in the read response packet into the reserved buffer region, and further processes the read response packet with reference to the procedure described in S11 to S16 above, so as to implement persistent storage of the to-be-written data carried in the read response packet. Details are not described herein again.

In still another possible case, if the first I/O request is an I/O read request, after reserving the required buffer region for the first I/O request, the RNIC of the storage server further processes the first I/O request with reference to the method described in S21 to S26, so as to send all to-be-read data that the first I/O request requests to read to the first client device. Details are not described herein again.

S1023. If the RNIC of the storage server determines that the size of the first buffer is greater than the size of the idle buffer region in the first buffer region, the RNIC of the storage server re-determines, after preset duration, whether the size of the first buffer is less than or equal to the size of the idle buffer region in the first buffer region.

A specific value of the preset duration is not limited in this embodiment of this application. For example, the preset duration may be 1 second, 0.5 second, or the like.

It should be understood that, if the RNIC of the storage server determines that the size of the first buffer is greater than the size of the idle buffer region in the first buffer region, it indicates that the idle buffer region in the first buffer region is insufficient to buffer the data of the first I/O request. Therefore, after the preset duration, the RNIC of the storage server may re-determine whether the size of the first buffer is less than or equal to the size of the idle buffer region in the first buffer region. The idle buffer region in the first buffer region herein is a buffer region that is in the first buffer region and that is not reserved for another I/O request for accessing the first hard disk at a moment after the preset duration from a current moment, and a buffer region that does not buffer data of I/O requests for accessing the first hard disk in the first buffer region.

It may be understood that, in the preset duration after the current moment, processing of an I/O request for accessing the first hard disk may be completed. In this way, a buffer region that is in the first buffer region and that buffers data of processed I/O requests is cleared and recycled by the RNIC of the storage server. Therefore, at the moment after the preset duration from the current moment, the size of the idle buffer region in the first buffer region may be greater than the size of the idle buffer region in the first buffer region at the current moment. Therefore, at the moment after the preset duration from the current moment, the idle buffer region in the first buffer region is sufficient to buffer the data of the first I/O request.

In this way, after the preset duration, if the RNIC of the storage server determines that the size of the first buffer is less than or equal to the size of the idle buffer region in the first buffer region, S1022 is performed. After the preset duration, if the RNIC of the storage server determines that the size of the first buffer is still greater than the size of the idle buffer region in the first buffer region, S1023 may be performed again.

It should be noted that, if a quantity of times that the RNIC of the storage server determines whether the size of the first buffer is less than or equal to the size of the idle buffer region in the first buffer region reaches a specified threshold, the RNIC of the storage server returns, to the first client device, first information indicating that the storage server is busy at present, so that the first client device resends the first I/O request to the storage server after a period of time, or the first client device does not send the first I/O request to the storage server. In this way, congestion of an I/O path for the storage server to read and write the first hard disk can be reduced. The specified threshold is not limited in this embodiment of this application. For example, the specified threshold may be set to 3, 5, or the like.

It can be learned that, in this embodiment of this application, each hard disk of the storage server is provided with an independent buffer region. Therefore, based on the traffic control method described in S101 and S102, after receiving the first I/O request for accessing the first hard disk, the storage server only needs to determine whether the idle buffer region in the first buffer region uniquely corresponding to the first hard disk is sufficient to buffer the data of the first I/O request, and perform corresponding processing. In this way, even if the first hard disk is slow in reading/writing due to a fault or another reason, reading and writing of another hard disk of the storage server are not affected, thereby ensuring overall performance of a storage system in which the storage server is located.

In addition, in this embodiment of this application, each hard disk of the storage server is provided with an independent buffer region. Therefore, even if a client device sends a large quantity of I/O requests for accessing the first hard disk to the storage server in a short time, the storage server only fully occupies a buffer region corresponding to the first hard disk to process these I/O requests, and a speed at which another client device accesses another hard disk of the storage server is not affected. That is, according to the traffic control method described in S101 and S102 provided in this embodiment of this application, a problem that available resources are not uniformly distributed occurring when a plurality of client devices accesses the storage server can be avoided.

In addition, in the traffic control method provided in this embodiment of this application, when determining, for a plurality of times, that the idle buffer region in the first buffer region is insufficient to buffer the I/O data of the first I/O request, the RNIC of the storage server returns, to the first client device, an indication message indicating that the storage server is busy, so that the first client device suspends sending of the first I/O request, thereby reducing congestion of the I/O path for the storage server to read and write the first hard disk.

In some embodiments, if the I/O request is an I/O read request (for example, the I/O read request described in FIG. 1A) or an I/O write request that does not carry to-be-written data (for example, the I/O read request described in FIG. 1B), an embodiment of this application further provides another traffic control method.

Figure 7:
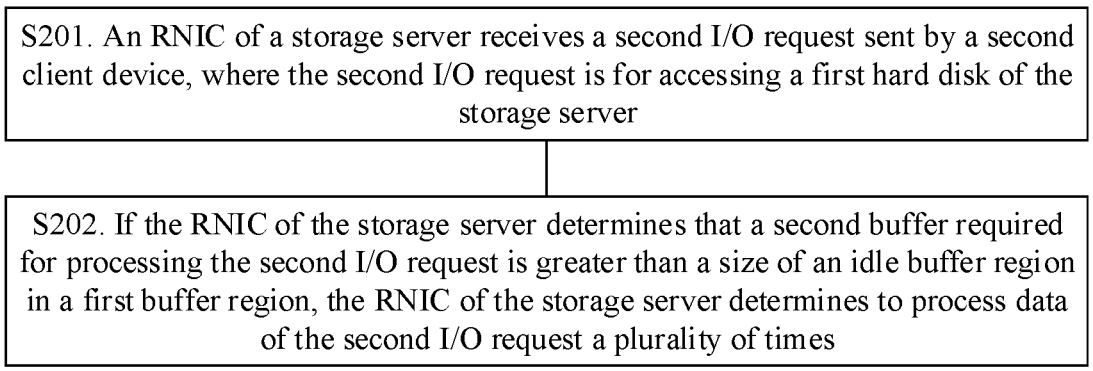
FIG. 7 is a schematic flowchart of another traffic control method according to an embodiment of this application.

Refer to FIG. 7, FIG. 7 is a schematic flowchart of another traffic control method according to an embodiment of this application. The method is used for a server device having the structure shown in FIG. 3 or FIG. 4. Optionally, an example in which the server device is a storage server in a centralized storage system is used. In this case, the method is further used for a storage server that is in the network system shown in FIG. 2 and has the structure shown in FIG. 3 or FIG. 4. The method includes the following steps.

S201. An RNIC of the storage server receives a second I/O request sent by a second client device, where the second I/O request is for accessing a first hard disk of the storage server.

For detailed descriptions that the RNIC of the storage server receives the second I/O request sent by the second client device, where the second I/O request is for accessing the first hard disk of the storage server, refer to the foregoing descriptions that the RNIC of the storage server receives the first I/O request sent by the first client device, where the first I/O request is for accessing the first hard disk of the storage server in S101. Details are not described again.

S202. If the RNIC of the storage server determines that a second buffer required for processing the second I/O request is greater than a size of an idle buffer region in a first buffer region, the RNIC of the storage server determines to process data of the second I/O request a plurality of times.

In other words, when the RNIC of the storage server determines that the second buffer required for processing the second I/O request is greater than the size of the idle buffer region in the first buffer region, the RNIC of the storage server determines to buffer the data of the second I/O request in the first buffer region a plurality of times.

Further, in a possible case, if the second I/O request is an I/O read request (for example, the I/O read request described in FIG. 1A), the size of the second buffer is a size of to-be-read data carried in the second I/O request.

In this case, when the RNIC of the storage server determines that the size of the second buffer is greater than the size of the idle buffer region in the first buffer region, the RNIC of the storage server divides, based on the size of the idle buffer region in the first buffer region and the size of the to-be-read data carried in the second I/O request, the to-be-read data that the second I/O request requests to read into a plurality of data blocks, buffers one of the plurality of data blocks in the first buffer region each time, and sends the data block to the second client device. In this way, all the plurality of data blocks can be sent to the second client device through a plurality of times of sending, so that all the to-be-read data that the second I/O request requests to read is sent to the second client device. That is, the RNIC of the storage server processes, a plurality of times, the to-be-read data requested by the second I/O request.

It should be noted that a size of a single data block sent by the RNIC of the storage server to the second client device each time should be less than or equal to the size of the idle buffer region in the first buffer region. In this way, it can be ensured that the storage server buffers, in the idle buffer region in the first buffer region, one data block in the to-be-read data from a storage address for storing the to-be-read data, to generate a read response packet carrying the data block, and send the read response packet to the second client device. It should be understood that, after the RNIC of the storage server sends, to the second client device, the read response packet carrying the data block, a buffer region that is in the first buffer region and that buffers the data block is cleared and recycled. In this way, the idle buffer region in the first buffer region is sufficient to buffer a next to-be-sent data block. For descriptions of the read response packet, refer to the descriptions of the read response packet in FIG. 1A. For a process in which the RNIC of the storage server sends a data block, refer to the foregoing descriptions of S21 to S26. Details are not described herein again.

In another possible case, if the second I/O request is an I/O write request that does not carry to-be-written data (for example, the I/O write request described in FIG. 1B), the size of the second buffer is a size of the to-be-written data carried in the second I/O request.

In this case, when the RNIC of the storage server determines that the size of the second buffer is greater than the size of the idle buffer region in the first buffer region, the RNIC of the storage server divides, based on the size of the idle buffer region in the first buffer region and the size of the to-be-written data carried in the second I/O request, the to-be-written data that the second I/O request requests to write into a plurality of data blocks, reads one data block in the plurality of data blocks from the second client device each time, buffers the read data block in the idle buffer region in the first buffer region each time, and persistently stores the data block. In this way, the plurality of data blocks can be read from the second client device through a plurality of times of reading, thereby implementing reading, from the second client device, all the to-be-written data that the second I/O request requests to write. That is, the RNIC of the storage server processes, a plurality of times, the to-be-written data requested by the second I/O request.

It should be noted that a size of a single data block that is read by the RNIC of the storage server from the second client device each time should be less than or equal to the size of the idle buffer region in the first buffer region. In this way, it can be ensured that the RNIC of the storage server reserves, in the idle buffer region in the first buffer region, a buffer region corresponding to the size of the single data block for the single data block. In this way, after the RNIC of the storage server reads a data block in the to-be-written data, the buffer region reserved for the data block can be used to buffer the data block, so that the first hard disk can persistently store the data block. It should be understood that, after the first hard disk persistently stores a data block, the first hard disk notifies the RNIC of the storage server to clear and recycle a buffer region that is in the first buffer region and that stores the data block. In this way, the idle buffer region in the first buffer region is sufficient to reserve a buffer region for a next to-be-read data block. For descriptions of a procedure in which the RNIC of the storage server reads the data block from the client device, refer to the foregoing related descriptions of reading the to-be-written data in FIG. 1B, and for descriptions that the first hard disk notifies the RNIC of the storage server to clear and recycle the buffer region that is in the first buffer region and that buffers the data block, refer to the foregoing descriptions of S14 and S15. Details are not described again.

It should be further noted that in a process in which the RNIC of the storage server divides the to-be-read/to-be-written data into the plurality of data blocks based on the size of the idle buffer region in the first buffer region and the size of the to-be-read/to-be-written data that is indicated by the second I/O request, the to-be-read/to-be-written data may be evenly or randomly divided into j (j is a positive integer) data blocks, and a size of each data block obtained after division is less than or equal to the size of the idle buffer region in the first buffer region. Alternatively, the RNIC of the storage server may divide the to-be-read/to-be-written data into a plurality of data blocks whose single data block size is k, where k is a positive number and is less than or equal to the size of the idle buffer region in the first buffer region.

For example, assuming that the size of the idle buffer region in the first buffer region is 1 MB, and the size of the to-be-read/to-be-written data indicated by the second I/O request is 1.6 MB, the RNIC of the storage server may divide the to-be-read/to-be-written data into two data blocks. Sizes of the two data blocks may be 0.8 MB and 0.8 MB respectively, or 0.6 MB and 1 MB respectively. This is not limited herein. Alternatively, the RNIC of the storage server may divide the to-be-read/to-be-written data into a single data block whose size is 0.4 MB, and the RNIC of the storage server may obtain 1.6/0.4-4 data blocks after dividing the to-be-read/to-be-written data.

In this way, by using the traffic control method described in S201 and S202, the storage server actively controls sizes of read and written data, thereby improving a success rate of successfully processing the I/O request.

In some other embodiments, an embodiment of this application further provides another traffic control method. Refer to FIG. 8, FIG. 8 is a schematic flowchart of still another traffic control method according to an embodiment of this application. The method is used for a server device having the structure shown in FIG. 3 or FIG. 4. Optionally, an example in which the server device is a storage server in a centralized storage system is used. In this case, the method is used for a storage server that is in the network system shown in FIG. 2 and has the structure shown in FIG. 3 or FIG. 4. In the method, S101 described above may be first performed, and then the following steps are performed.

S301. The RNIC of the storage server determines a size of occupied space in a first buffer region corresponding to the first hard disk.

The first buffer region corresponding to the first hard disk is dedicated to buffering data of I/O requests for accessing the first hard disk.

Optionally, the occupied space in the first buffer region includes a buffer region that is in the first buffer region and in which I/O data is not buffered but that has been reserved for another I/O request for accessing the first hard disk, and a buffer region that is in the first buffer region and in which data has been buffered. Optionally, the occupied space in the first buffer region further includes a buffer region reserved for the first I/O request.

S302. When determining that the size of the occupied space in the first buffer region meets a first preset condition, the RNIC of the storage server sends a congestion indication to the first client device.

Optionally, the first preset condition may be a threshold, for example, a first threshold. That the first preset condition is met means that the RNIC of the storage server determines that the size of the occupied space in the first buffer region reaches the first threshold.

Optionally, the first preset condition may be a preset proportion, for example, a first proportion. That the first preset condition is met means that the RNIC of the storage server determines that a proportion of the occupied space in the first buffer region to the first buffer region reaches the first proportion.

The congestion indication indicates the first client to reduce a quantity of I/O requests sent for accessing the first hard disk.

For example, the congestion indication may be, for example, a congestion notification packet (CNP). It should be noted that, a larger quantity of CNPs received by the client device in a unit time indicates a smaller quantity of I/O requests sent by the client device for accessing the first hard disk in the unit time.

Optionally, the RNIC of the storage server may further determine a size of an idle buffer region in the first buffer region based on the size of the occupied space in the first buffer region. In this way, the congestion indication further indicates the size of the idle buffer region in the first buffer region.

In a possible implementation, the congestion indication may carry the size of the idle buffer region in the first buffer region. In this way, the first client device that receives the congestion indication may determine, based on the size of the idle buffer region in the first buffer region and a size of a buffer required for a to-be-sent single I/O request for accessing the first hard disk, a quantity of I/O requests subsequently sent for accessing the first hard disk.

For example, assuming that the size of the idle buffer region in the first buffer region carried in the congestion indication is 1 MB, and the size of the buffer required by the single I/O request for accessing the first hard disk and to be sent by the first client device that receives the congestion indication is 0.4 MB, the first client device may determine that two (obtained by rounding down 1/0.4) I/O requests whose sizes are both 0.4 MB for accessing the first hard disk may be sent to the storage server.

In another possible implementation, the RNIC of the storage server may determine, based on the determined size of the idle buffer region in the first buffer region and an average size of a buffer required by historically received I/O requests for accessing the first hard disk (or a maximum size of a buffer required by historically received I/O requests for accessing the first hard disk), a quantity of I/O requests that the client device is allowed to send for accessing the first hard disk. Then, the RNIC of the storage server adds the quantity to the congestion indication, so as to indicate the size of the idle buffer region in the first buffer region by using the quantity, and indicate the client device that receives the congestion indication to send, based on the indication, a corresponding quantity of I/O requests for accessing the first hard disk.

Certainly, the first client device may further determine, based on the size of the idle buffer region in the first buffer region that is indicated by the congestion indication, a size of a single I/O request sent for accessing the first hard disk. It may be understood that the size of the single I/O request is less than the size of the idle buffer region in the first buffer region.

In an actual application, the RNIC of the storage server has a specific parallel processing capability, that is, the RNIC of the storage server may process a plurality of I/O requests in parallel.

In this case, in a possible case, when the RNIC of the storage server receives and processes in parallel the plurality of I/O requests for accessing the first hard disk, if the storage server determines that the size of the occupied space in the first buffer region meets the first preset condition, the storage server sends a congestion indication to a client device that sends at least a part of the plurality of I/O requests, where the congestion indication indicates the client device that receives the congestion indication to reduce a quantity of I/O requests sent for accessing the first hard disk. It may be understood that, for the congestion indication, refer to the foregoing congestion indication. Details are not described again.

It may be understood that a quantity of congestion indications sent by the RNIC of the storage server is the same as a quantity of the at least a part of I/O requests, that is, one of the at least a part of I/O requests corresponds to one congestion indication.

The at least a part of I/O requests may be determined by the RNIC of the storage server from the plurality of I/O requests based on a preset policy.

Optionally, the preset policy includes randomly determining, by the RNIC of the storage server, at least a part of I/O requests from the plurality of I/O requests, or determining, by the RNIC of the storage server, at least a part of I/O requests from the plurality of I/O requests based on a preset proportion. For example, if the preset proportion is 50%, the RNIC of the storage server determines that half of I/O requests in the plurality of I/O requests are the at least a part of I/O requests.

It should be understood that the foregoing preset policy is merely an example for description, and any policy that can be used to determine at least a part of I/O requests from the plurality of I/O requests should fall within the protection scope of embodiments of this application.

Optionally, after determining the at least a part of I/O requests from the plurality of I/O requests, the RNIC of the storage server marks the at least a part of I/O requests with labels. Then, the RNIC of the storage server sends a congestion indication to each client device configured to send the I/O requests marked with the labels.

In another possible case, when the RNIC of the storage server receives and processes in parallel the plurality of I/O requests for accessing the first hard disk, if the storage server determines that the size of the occupied space in the first buffer region meets a second preset condition, the storage server sends a congestion indication to a client device that sends each of the plurality of I/O requests, where the congestion indication indicates the client device that receives the congestion indication to reduce a quantity of I/O requests sent for accessing the first hard disk. It may be understood that, for the congestion indication, refer to the foregoing congestion indication. Details are not described again.

It may be understood that a quantity of congestion indications sent by the RNIC of the storage server is the same as a quantity of the plurality of I/O requests, that is, each of the plurality of I/O requests corresponds to one congestion indication.

Optionally, the second preset condition may be a threshold, for example, a second threshold, and the second threshold is greater than the first threshold. In this case, that the second preset condition is met means that the RNIC of the storage server determines that the size of the occupied space in the first buffer region reaches the second threshold.

Optionally, the second preset condition may be a preset proportion, for example, a second proportion, and the second proportion is greater than the first proportion. In this case, that the second preset condition is met means that the RNIC of the storage server determines that a proportion of the occupied space in the first buffer region to the first buffer region reaches the second proportion.

It can be learned that the first preset condition is equivalent to a low water marker of the proportion of the occupied space in the first buffer region, and the second preset condition is equivalent to a high water marker of the proportion of the occupied space in the first buffer region. Therefore, when the occupied space in the first buffer region meets the second preset condition, it indicates that available space in the first buffer region is to be fully occupied.

In this way, when determining that the size of the occupied space in the first buffer region meets the second preset condition, the RNIC of the storage server sends the congestion indication to the client device configured to send each of the plurality of I/O requests. In this way, the client device that accesses the first hard disk can receive more congestion indications, so that the client device may further reduce a quantity of I/O requests sent for accessing the first hard disk, and even stop sending the I/O requests for accessing the first hard disk to the storage server. In this way, congestion on the I/O path for the storage server to read/write the first hard disk can be alleviated or avoided.

It should be further understood that, when the RNIC of the storage server determines that the occupied space in the first buffer region does not meet the first preset condition and the second preset condition, the RNIC of the storage server does not return a congestion indication to the client device that requests to access the first hard disk. That is, the I/O path for the RNIC of the current storage server to read and write the first hard disk is smooth at present.

S303. After the storage server processes the first I/O request, the RNIC of the storage server sends an I/O response packet to the first client device.

The I/O response packet indicates that the first I/O request has been processed. Herein, for detailed descriptions of processes that the storage server processes the first I/O request, and after the first I/O request is processed, the RNIC of the storage server sends the I/O response packet indicating that the first I/O request has been processed to the first client device, refer to the foregoing descriptions of S11 to S16 or S21 to S26. Details are not described herein again.

Optionally, the I/O response packet further indicates the size of the idle buffer region in the first buffer region.

It should be understood that for detailed descriptions that the I/O response packet indicates the size of the idle buffer region in the first buffer region, refer to the related descriptions that the congestion indication indicates the size of the space buffer region in the first buffer region in S302. Details are not described herein again.

It should be noted that in this embodiment of this application, any one of the I/O response packet and the congestion indication may be used to indicate the size of the idle buffer region in the first buffer region.

In this way, because each hard disk is configured with an independent buffer region, by using the traffic control method shown in FIG. 8, the storage server can control, in a targeted manner, a quantity and/or a size of I/O requests that are sent by each client device for accessing each hard disk, thereby reducing or even avoiding congestion of an I/O path when the storage server reads/writes each hard disk. In this way, even if a transmission bandwidth of the RNIC in the storage server is greater than a read and write bandwidth of the hard disk, by using the traffic control method shown in FIG. 8 in embodiments of this application, a quantity and/or a size of I/O requests for reading and writing each hard disk in the storage server can be controlled in a targeted manner, thereby avoiding a problem that congestion occurs on an I/O path when the storage server reads/writes each hard disk.

In addition, it should be noted that the storage server may simultaneously perform the traffic control methods shown in FIG. 6, FIG. 7, and FIG. 8, or separately perform the traffic control methods shown in FIG. 6, FIG. 7, or FIG. 8. This is not limited in embodiments of this application.

The foregoing mainly describes the solutions provided in embodiments of this application in terms of a method. To implement the foregoing functions, as shown in FIG. 9, FIG. 9 is a schematic diagram of a structure a traffic control apparatus 90 according to an embodiment of this application. The traffic control apparatus 90 is used for a server device having the structure shown in FIG. 3 or FIG. 4, and may be configured to perform the foregoing traffic control method, for example configured to perform the method shown in FIG. 6, FIG. 7, or FIG. 8. The traffic control apparatus 90 may include a receiving unit 91 and a processing unit 92.

The receiving unit 91 is configured to receive a first I/O request sent by a first client device in a plurality of client devices. The first I/O request is for accessing a first hard disk of the server device, the plurality of client devices is connected to the server device, and the first hard disk is one of a plurality of hard disks configured for the server device. The processing unit 92 is configured to process the first I/O request by using a first buffer region in a plurality of buffer regions. The plurality of buffer regions is respectively for buffering data of I/O requests for accessing the plurality of hard disks, and the first buffer region is dedicated to buffering data of I/O requests for accessing the first hard disk.

For example, with reference to FIG. 6, the receiving unit 91 may be configured to perform S101, and the processing unit 92 may be configured to perform S102.

Optionally, the processing unit 92 is further configured to determine that a size of occupied space in the first buffer region meets a first preset condition. The traffic control apparatus 90 further includes a sending unit 93 configured to send, in response to the determining, a congestion indication to the first client device, where the congestion indication indicates the first client device to reduce a quantity of I/O requests sent for accessing the first hard disk.

For example, with reference to FIG. 8, the processing unit 92 may be configured to perform S301 and S302, and the sending unit 93 may be configured to perform S302.

Optionally, the congestion indication further indicates a size of an idle buffer region in the first buffer region.

Optionally, the sending unit 93 is further configured to send an I/O response packet to the first client device, where the I/O response packet indicates that the first I/O request has been processed and indicates a size of an idle buffer region in the first buffer region.

For example, with reference to FIG. 8, the sending unit 93 may be configured to perform S303.

Optionally, the receiving unit 91 is further configured to receive a plurality of I/O requests for accessing the first hard disk. The processing unit 92 is further configured to determine that a size of occupied space in the first buffer region meets a first preset condition. The sending unit 93 is further configured to send, in response to the determining, a congestion indication to a client device that sends at least a part of the plurality of I/O requests, where the congestion indication indicates the client device that receives the congestion indication to reduce a quantity of I/O requests sent for accessing the first hard disk.

Optionally, the receiving unit 91 is further configured to receive a second I/O request sent by a second client device in the plurality of client devices, where the second I/O request is an I/O request for accessing the first hard disk. The processing unit 92 is further configured to determine that a buffer required for processing the second I/O request is greater than the size of the idle buffer region in the first buffer region, and buffer, in the first buffer region a plurality of times, data that the second I/O request requests to process.

For example, with reference to FIG. 7, the receiving unit 91 may be configured to perform S201, and the processing unit 92 may be configured to perform S202.

Optionally, the first buffer region is set in a memory of the server device, or the first buffer region is set in the first hard disk.

For detailed descriptions of the foregoing optional manners, refer to the foregoing method embodiments. Details are not described herein again. In addition, for explanations and descriptions of beneficial effects of any one of the foregoing traffic control apparatuses 90, refer to the foregoing corresponding method embodiments. Details are not described again.

For example, with reference to FIG. 5, a function implemented by the processing unit 92 in the traffic control apparatus 90 may be implemented by the processor 51 in FIG. 5 by executing the program instructions in the memory 52 in FIG. 5. Functions implemented by the receiving unit 91 and the sending unit 93 may be implemented by the communication interface 53 in FIG. 5.

A person skilled in the art should be easily aware that, in combination with the units and algorithm steps of the examples described in embodiments disclosed in this specification, this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of this application.

It should be noted that module division in FIG. 9 is an example, and is merely logical function division. In an actual implementation, there may be another division manner. For example, two or more functions may be integrated into one processing module. The integrated module may be implemented in a form of hardware, or may be implemented in a form of a software functional module.

An embodiment of this application further provides a computer program product and a computer-readable storage medium configured to store the computer program product. The computer program product may include one or more program instructions. When the one or more program instructions are run by one or more processors, the foregoing functions or some functions described in FIG. 6, FIG. 7, or FIG. 8 may be provided. Therefore, for example, one or more features of S101 and S102 in FIG. 6 may be carried by one or more instructions in the computer program product.

In some examples, the traffic control apparatus described for FIG. 6, FIG. 7, or FIG. 8 may be configured to provide various operations, functions, or actions in response to one or more program instructions stored in the computer-readable storage medium.

All or a part of the foregoing embodiments may be implemented by software, hardware, firmware, or any combination thereof. When a software program is used to implement the foregoing embodiments, all or a part of the foregoing embodiments may be implemented in a form of a computer program product. The computer program product includes one or more computer instructions. When the computer-executable instructions are executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium (for example, an SSD).

What is claimed is:

1. A method implemented by a server device, wherein the method comprises:
receiving a first input/output (I/O) request from a first client device of a plurality of client devices, wherein the first I/O request is for accessing a first hard disk of the server device, and wherein the first hard disk is one of a plurality of hard disks configured for the server device; and
processing the first I/O request using a first buffer region in a plurality of buffer regions, wherein the plurality of buffer regions are for buffering first data of second I/O requests for accessing the plurality of hard disks, wherein the first buffer region is dedicated to buffering second data of third I/O requests for accessing the first hard disk, and wherein the first I/O request is one of the third I/O requests; and
sending an I/O response packet to the first client device, wherein the I/O response packet indicates that the first I/O request has been processed and further indicates a size of an idle buffer region in the first buffer region.

2. The method of claim 1, further comprising:
determining that a first size of occupied space in the first buffer region meets a first preset condition; and
sending, in response to the determining, a congestion indication to the first client device, wherein the congestion indication indicates to the first client device to reduce a quantity of the third I/O requests.

3. The method of claim 2, wherein the congestion indication further indicates a second size of the idle buffer region in the first buffer region.

4. The method of claim 1, further comprising:
receiving fourth I/O requests for accessing the first hard disk;
determining that a size of occupied space in the first buffer region meets a first preset condition; and
sending, in response to the determining, a congestion indication to a second client device that sends a part of the fourth I/O requests, wherein the congestion indication indicates to the second client device to reduce a quantity of the part of the fourth I/O requests.

5. The method of claim 1, further comprising:
receiving a fourth I/O request from a second client device in the client devices and for accessing the first hard disk;
determining that a buffer for processing the fourth I/O request is greater than the size of the idle buffer region in the first buffer region; and
buffering, in the first buffer region for a plurality of times, third data that the fourth I/O request requests to process.

6. The method of claim 1, further comprising setting the first buffer region in a memory of the server device.

7. The method of claim 1, further comprising setting the first buffer region in the first hard disk.

8. A server device comprising:
a transmission interface; and
one or more processors coupled to the transmission interface and configured to:
receive, using the transmission interface, a first input/output (I/O) request from a first client device of a plurality of client devices, wherein the first I/O request is for accessing a first hard disk of the server device, and wherein the first hard disk is one of a plurality of hard disks configured for the server device; and
process the first I/O request using a first buffer region of buffer regions, wherein the buffer regions are for buffering first data of a plurality of second I/O requests for accessing the plurality of hard disks, wherein the first buffer region is dedicated to buffering second data of a plurality of third I/O requests for accessing the first hard disk, and wherein the first I/O request is one of the plurality of third I/O requests; and
send, using the transmission interface, an I/O response packet to the first client device, and wherein the I/O response packet indicates that the first I/O request has been processed and further indicates a size of an idle buffer region in the first buffer region.

9. The server device of claim 8, wherein the one or more processors are further configured to:
determine that a first size of occupied space in the first buffer region meets a first preset condition; and
send, in response to the determining and using the transmission interface, a congestion indication to the first client device, wherein the congestion indication indicates to the first client device to reduce a quantity of the plurality of third I/O requests.

10. The server device of claim 9, wherein the congestion indication further indicates a second size of the idle buffer region in the first buffer region.

11. The server device of claim 8, wherein the one or more processors are further configured to:
receive, using the transmission interface, a plurality of fourth I/O requests for accessing the first hard disk;
determine that a size of occupied space in the first buffer region meets a first preset condition; and
send, in response to the determining and using the transmission interface, a congestion indication to a second client device that sends a part of the plurality of fourth I/O requests, wherein the congestion indication indicates to the second client device to reduce a quantity of the part of the plurality of fourth I/O requests.

12. The server device of claim 8, wherein the one or more processors are further configured to:
receive, using the transmission interface, a fourth I/O request from a second client device in the client devices, wherein the fourth I/O request is for accessing the first hard disk;
determine that a buffer for processing the fourth I/O request is greater than the size of the idle buffer region in the first buffer region; and
buffer, in the first buffer region for a plurality of times, third data that the fourth I/O request requests to process.

13. The server device of claim 8, further comprising a memory coupled to the one or more processors, wherein the one or more processors are further configured to set the first buffer region in the memory.

14. The server device of claim 8, further comprising a memory coupled to the one or more processors, wherein the one or more processors are further configured to set the first buffer region in the first hard disk.

15. A storage system comprising:
    a plurality of client devices comprising a first client device that is configured to send a first input/output (I/O) request; and
    a server device coupled to the client devices and configured to:
        receive the first I/O request from the first client device of the plurality of client devices, wherein the first I/O request is for accessing a first hard disk of the server device, and wherein the first hard disk is one of a plurality of hard disks configured for the server device; and
        process the first I/O request using a first buffer region in a plurality of buffer regions, wherein the plurality of buffer regions are for buffering first data of a plurality of second I/O requests for accessing the plurality of hard disks, wherein the first buffer region is dedicated to buffering second data of a plurality of third I/O requests for accessing the first hard disk, and wherein the first I/O request is one of the plurality of third I/O requests;
        determine that a size of occupied space in the first buffer region meets a first preset condition; and
        send, in response to the determining, a congestion indication to the first client device, wherein the congestion indication indicates to the first client device to reduce a quantity of the plurality of third I/O requests.

16. The storage system of claim 15, wherein the server device is further configured to send an I/O response packet to the first client device, and wherein the I/O response packet indicates that the first I/O request has been processed and further indicates a size of an idle buffer region in the first buffer region.

17. The storage system of claim 15, wherein the server device is further configured to:
    receive a plurality of fourth I/O requests for accessing the first hard disk;
    determine that the size of occupied space in the first buffer region meets preset condition; and
    send, in response to the determining, a congestion indication to a second client device that sends a part of the fourth plurality of I/O requests, wherein the congestion indication indicates to the second client device to reduce a quantity of the part of the plurality of fourth I/O requests.

18. The storage system of claim 17, wherein the congestion indication further indicates a second size of an idle buffer region in the first buffer region.

19. The storage system of claim 15, wherein the server device is further configured to:
    receive a fourth I/O request from a second client device in the plurality of client devices, wherein the fourth I/O request is for accessing the first hard disk;
    determine that a buffer for processing the fourth I/O request is greater than a size of an idle buffer region in the first buffer region; and
    buffer, in the first buffer region for a plurality of times, third data that the fourth I/O request requests to process.

20. The storage system of claim 15, wherein the server device is further configured to set the first buffer region in a memory of the server device or in the first hard disk.

* * * * *